US006914554B1

(12) United States Patent
Riley et al.

(10) Patent No.: US 6,914,554 B1
(45) Date of Patent: Jul. 5, 2005

(54) RADAR BEAM STEERING WITH REMOTE REFLECTORS/REFRACTORS

(75) Inventors: Leon H. Riley, Huntsville, AL (US); Brian R. Strickland, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/690,160

(22) Filed: Oct. 17, 2003

(51) Int. Cl.⁷ ............................................. G01S 13/66
(52) U.S. Cl. ........................... 342/58; 342/59; 342/62; 342/77; 342/81; 342/97; 342/107; 244/3.14
(58) Field of Search ............................. 342/58–60, 62, 342/63, 74, 75, 77–81, 90, 95–97, 107, 125, 126, 156–158; 244/3.11, 3.13, 3.14, 3.16, 3.19

(56) References Cited

U.S. PATENT DOCUMENTS

| | | | | |
|---|---|---|---|---|
| 2,557,401 A | * | 6/1951 | Agins et al. ............... 244/3.11 |
| 2,745,095 A | * | 5/1956 | Stoddard ..................... 342/58 |
| 3,026,517 A | * | 3/1962 | Nameth et al. ............. 343/758 |
| 3,126,172 A | * | 3/1964 | Parkinson .................. 244/3.13 |
| 3,271,772 A | * | 9/1966 | Rossero et al. ............. 343/771 |
| 3,363,858 A | * | 1/1968 | Dobbins et al. ........... 244/3.14 |
| 3,706,096 A | * | 12/1972 | Hammack ................... 342/107 |
| 4,173,760 A | | 11/1979 | Garrison |
| 4,174,818 A | * | 11/1979 | Glenn ....................... 244/3.13 |
| 4,309,704 A | | 1/1982 | Anderson |
| 4,507,662 A | | 3/1985 | Rothenberg et al. |
| 5,239,668 A | | 8/1993 | Davis |
| 5,313,221 A | | 5/1994 | Denton, Jr. |
| 5,564,698 A | | 10/1996 | Honey et al. |
| 6,492,937 B1 | | 12/2002 | Sparrow et al. |
| 6,703,970 B2 | * | 3/2004 | Gayrard et al. ............. 342/354 |

OTHER PUBLICATIONS

"Range antenna pattern measurements of airborne SAR system with arrayed corner reflectors", Satake et al, Proceedings of IEEE International Geoscience and Remote Sensing Symposium. IGARSS 2002, vol. 2, Toronto, Ont., Canada, Jun. 24–28, 2002., p. 859–61.*
"Dynamic detection capability of a mobile bistatic weapons locating radar", Woodridge, K.; Banahan, C.P.;Radar Conference, 2003. Proceedings of the 2003 IEEE, May 5–8, 2003 Ps:179–184.*

* cited by examiner

*Primary Examiner*—John B. Sotomayor
(74) *Attorney, Agent, or Firm*—US Army Space and Missile Defense Command

(57) ABSTRACT

A reflected energy detecting device includes a transmitter for transmitting an electromagnetic signal and a receiver for receiving a reflected electromagnetic signal. An antenna may be operatively connected with the transmitter and the receiver for radiating the electromagnetic signal and capturing the reflected electromagnetic signal and the antenna may be movable. A main controller may be provided for controlling operation of the transmitter and the receiver and the movement of the antenna and the reflected energy detecting device may further include at least one platform. The at least one platform may support a remote reflector that is dimensioned and configured to redirect the transmitted electromagnetic signal in a desired direction and a platform controller that is configured to communicate with the main controller and to maintain alignment between the remote reflector and the antenna.

21 Claims, 2 Drawing Sheets

RADAR BEAM STEERING WITH REMOTE REFLECTORS/REFRACTORS

BACKGROUND OF THE INVENTION

1. Field of the Invention

The present invention relates to devices and methods for detecting reflected energy and, more particularly, to radar and ladar systems with enhanced range.

2. Related Art

The effective range of ground based radar and ladar systems for detecting, tracking and/or destroying targets, such as low flying aircraft and cruise missiles, is limited by line of sight. The line of sight in various directions from any particular location may be defined by the curvature of the earth and/or terrain features such as valleys, mountains and hills. This poses serious concern where it is necessary to detect and engage multiple targets in order to prevent a loss of life at a range that is greater than the effective range of the radar or ladar system.

In an attempt to increase the effective range, radar and ladar systems have been remotely located on towers, in aerostats, airships and aircraft. This requires that hundreds of pounds of electrical equipment requiring tens of kilowatts of power must be located remote from the ground. Military personnel must operate and maintain this radar hardware while it is remote from the ground. Accordingly, hardware weight, size, power requirements, operability, and maintainability make remotely locating these systems difficult and extremely expensive. Therefore, to date, no suitable device or method of increasing the effective range of radar or ladar is available.

SUMMARY OF THE INVENTION

In accordance with an embodiment of the present invention, a reflected energy detecting device comprises a transmitter for transmitting an electromagnetic signal and a receiver for receiving a reflected electromagnetic signal. An antenna may be operatively connected with the transmitter and the receiver for radiating the electromagnetic signal and capturing the reflected electromagnetic signal and the antenna may be movable. A main controller may be provided for controlling operation of the transmitter and the receiver and the movement of the antenna and the reflected energy detecting device may further comprise at least one platform. The at least one platform may support a remote reflector that is dimensioned and configured to redirect the transmitted electromagnetic signal in a desired direction and a platform controller that is configured to communicate with the main controller and to maintain alignment between the remote reflector and the antenna.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

Figure 1:
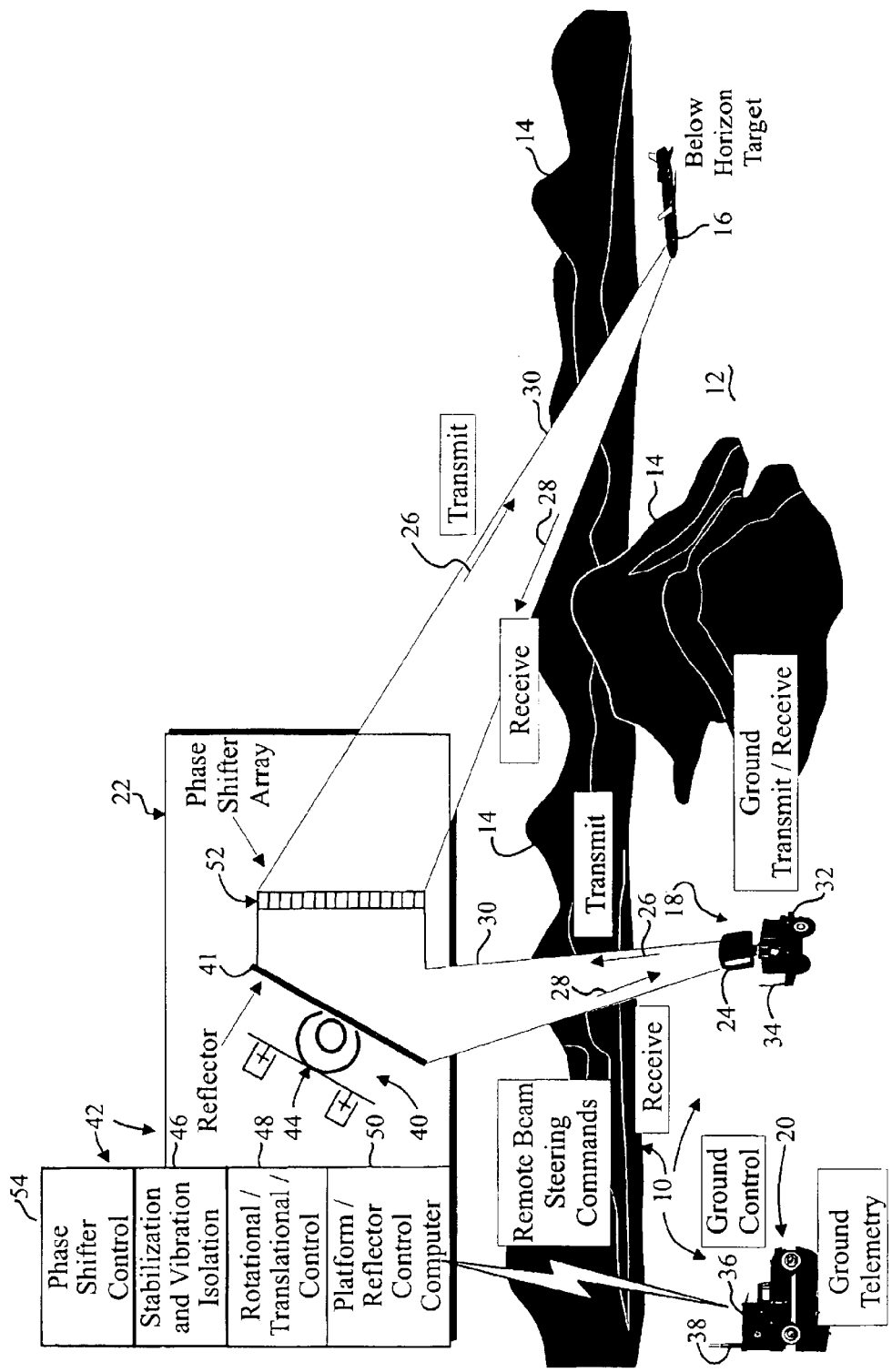
FIG. 1 is a diagrammatical view showing a reflected energy detecting device, in accordance with an embodiment of the present invention, that is employed to detect a target, such as a cruise missile, traveling over a mountainous terrain.

One embodiment of the present invention concerns locating a reflected energy detecting device such as radar or ladar hardware at ground level and transmitting a radar/ladar beam upward to an elevated platform that comprises a reflector and, optionally, a refractor or phase shifter. Ground control of the elevated reflector and the phase shifter may be made by radar/ladar operators through telemetry links. Translational and rotational position control, along with vertical referencing and stabilization, of the reflector and phase shifter may enable ground based radar operators to view over the horizon with a minimum amount of elevated hardware. Requirements for elevated radar operations are thus greatly reduced over those required in the prior art as ground based radar personnel are able to operate and maintain the radar/ladar hardware. The pointing and positional control for the reflector and the phase shifter may be the only functions that require hardware operation while located in the elevated position. Multiple reflectors and phase shifters may be employed for covering even very mountainous terrain.

It will be appreciated that radar beams transmitted from high gain radar antennas do not spread rapidly for an appreciable distance after leaving their antennas. This enables the reflection and phase shifting of these beams by reasonably sized electrical reflectors and phase shifters. Also, the reflectors may be very light weight because, it is believed, that the electrical reflection phenomena takes place very near the surface of a reflector.

The phase shifter may comprise an array of computer controlled phase shifters such as a space fed, phased array radar antenna. It will be understood that the phase shifters can be optionally embedded into a reflector such that steering of the beam can be accomplished at the reflector. Simple telemetry links may enable ground based control of these elevated reflectors and the associated phased array antennas elements. Sensors and simple low powered actuators can be located at the elevated reflectors to provide reflector positioning stabilization and pointing. The elevated reflector may feed the phased array antenna by reflecting the radar beams directly into this array. Beam steering or pointing of the elevated phased array can be controlled by electrically controlled phase shifters as is commonly provided space fed phased array radar antennas.

The elevated reflectors and phase shifters may be supported by platforms such as towers which may be mobile, tethered vehicles including aerostats or aerodynamic vehicles, or aircraft that may be manned or unmanned. The reflectors and phase shifters supported by towers and tethered vehicles may receive power and communications via, e.g., wired and/or wireless links. The reflectors and phase shifters supported by aircraft may be controlled by, e.g., microwave links and, it will be appreciated that the electrical energy requirements for reflector and/or phase shifter stabilization, positioning and/or pointing are minimal and well within the capability of existing aircraft power systems.

Referring now to FIG. 1, a reflected energy detecting device, in accordance with one embodiment of the present invention, is illustrated generally at 10. The reflected energy device is illustrated as being employed on a surface 12 of a terrain including mountains 14. A target 16, such as a terrain following cruise missile, is shown approaching the reflected energy detecting device 10.

In the illustrated embodiment, the reflected energy detecting device 10 may comprise a ground transmitter/receiver 18, a main or ground controller 20 and a platform 22. The ground transmitter/receiver 18 is preferably operated at a radar frequency, although, other frequencies including light frequencies may be employed. The ground transmitter/receiver 18 comprises an antenna 24 from which a transmitted electromagnetic signal may radiate as illustrated by arrows 26. As shown, the electromagnetic signal may be reflected from the target 16 as a reflected electromagnetic signal represented by arrows 28. Together the electromagnetic signal and reflected electromagnetic signal may form a beam 30. The antenna 24 is preferably of a directional type and may also be focused, in a known manner, at infinity or at a particular distance other than infinity. Also, it will be recognized that a more efficient reflected energy system may be possible by focusing the electromagnetic energy, in a known manner, as it is transmitted from the ground location. For example, very high intensity radar beams may be focused at a remote reflector to increase the efficiency of the transferred energy which may then pass these high intensity beams to space fed, phased array antennas for delivery of more power to the target than would be available from an antenna based system focused to infinity.

The ground transmitter/receiver 18 may be mounted to a trailer 32 for ease in mobility and may include an omnidirectional antenna 34 for communicating with the ground controller 20.

The ground controller 20 may be located within a truck 36 and may comprise a transmitter/receiver (not shown) for telemetry, antennas 38 and a computer system (also not shown) running tailored software for operation of the reflected energy detecting device 10. The ground controller 20 functions to control operation of the ground transmitter/receiver 18 in a known manner while also communicating with a platform controller (described in more detail below) which is located on the platform 22. It will be understood that while the ground controller 20 is described as communicating with the ground transmitter/receiver 18 via wireless, this is for illustrational purposes and a wired system may be employed in the practice of this invention.

The platform 22 may comprise, e.g., a tower, an aerostat, an aerodynamic vehicle, or an aircraft (manned or unmanned) which may support a reflector assembly 40 and a platform controller system 42. The reflector assembly 40 may comprise a reflector 41 that may be composed of radar and laser surface reflecting materials such as aluminum, silver or other electrically conducting materials. The reflector 41 may also comprise a metallic foil disposed on a polymeric substrate or a metallic screen for light weight. The reflector 41 may be connected to the platform 22 by a reflector interface 44 which in conjunction with a stabilization and vibration isolation control 46 and a rotational and translational control 48, of the platform controller system 42, effects reflector position and stabilization. This provides both for movement of the reflector 41 for directing the beam 30 in a desired direction and for mechanical isolation of the reflector from translational and rotational movements of the platform 22 that can occur as the result of air turbulence, winds or repositioning of elevated hardware. Also, the reflector 41 may be stably positioned above the ground transmitter/receiver 18 so that an antenna attitude control of the ground controller 20 can align the antenna 24 so that its beam 30 may be transmitted to the reflector 41 and on to the target 16 whereby returns from the target are scattered back along this same path. To achieve this result, it will be appreciated that position and attitude sensors may be employed in a known manner on the reflector 41 and platform 22 for precise stabilization and positioning of the reflector.

Alignment of the antenna 24 to the reflector 41 may be necessary prior to operation. Maintenance of this alignment may be provided automatically by a positional control system, e.g., co-located in the platform controller 42 and ground controller 20 after initial alignments are made.

The telemetry interface provided by the transmitter/receiver of the ground controller 20 and a platform reflector control computer 50 of the platform controller 42 greatly simplifies initial alignments of the antenna 24 and reflector 41 and maintenance of these alignments. It will be appreciated that the telemetry interface may be through wired system such as fiber optics, or via a wireless microwave link depending on the application and the platform employed.

After initial alignment operations, an operator may operate the reflected energy detection device 10 in a known target search, track, or search while track mode.

The reflector 41 may be rotated via rotational and translational control 48 whereby targets may be viewed throughout 360 degrees of azimuth. Instructions for control of the reflector 41 may be made through the ground controller 20, the transmit/receive telemetry to/from the platform controller 42 and the rotational/translation control 48.

Optionally, a phase shifter array 52 may be employed to increase the operational capability of the reflected energy detector 10. The phase shifter array 52 preferably comprises a space fed, phased array radar antenna. The phase shifter array 52 may function in a known manner such that the beam 30 may be phase shifted or steered to a desired location. Also, the phase shifter array may, in a known manner, may be employed in the detection and tracking of multiple targets. A phase shifter array controller 54 may be provided which communicates with the ground controller 20 whereby operational control of the phase shifter array 52 may be effected. It will be appreciated that the reflector 41 and phase shifter array 52 may be integrally connected as a one-piece system.

Figure 2:
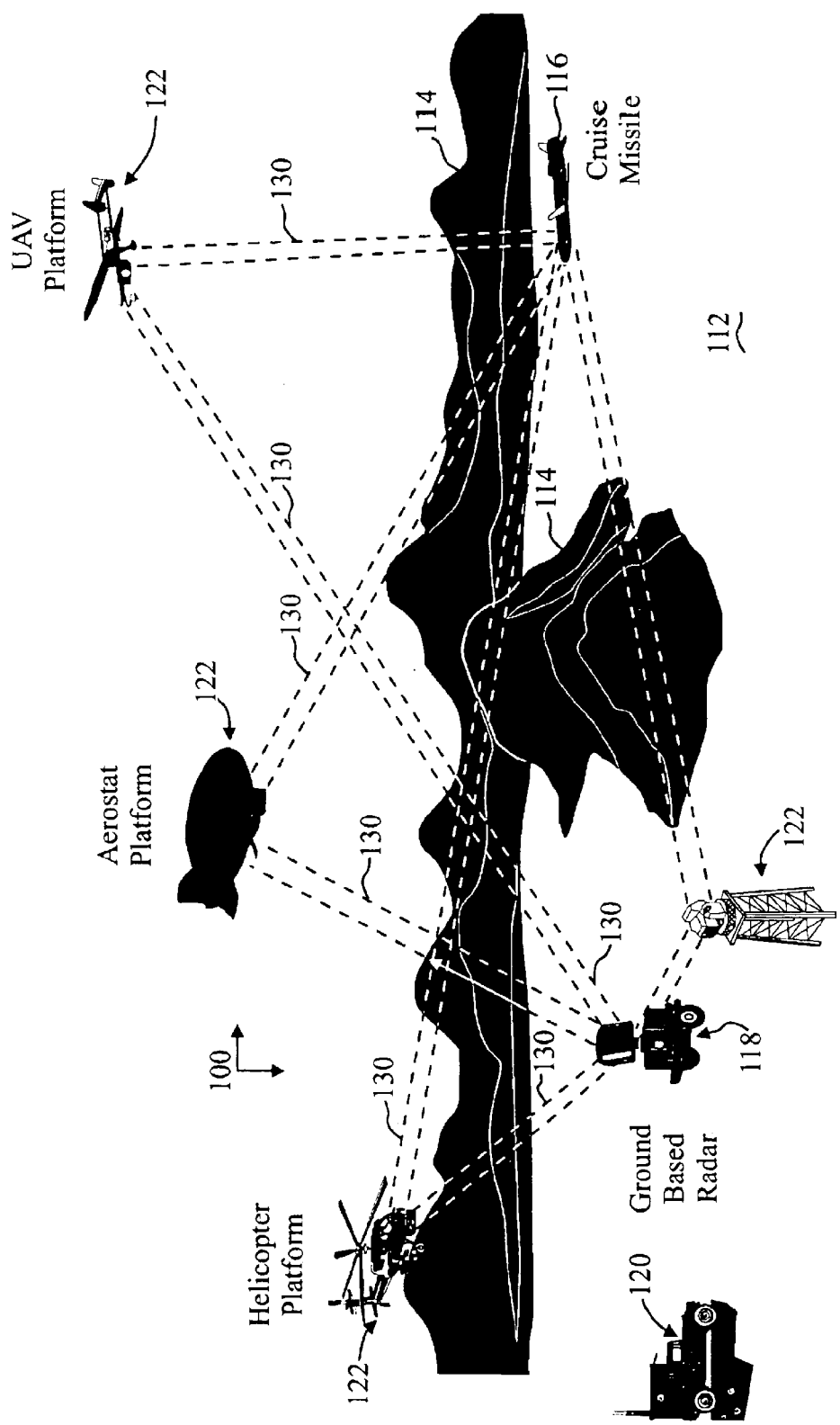
FIG. 2 is a diagrammatical view showing the reflected energy detecting device of FIG. 1 embodied in multiple platforms.

Referring now to FIG. 2, a multiple platform reflected energy detecting device is illustrated generally at 100. The reflected energy detecting device 100 may be similar to the reflected energy detecting device 10, described above, and thus similar reference numbers are used to refer to similar components. As illustrated, the reflected energy detecting device 100 may be employed on a surface 112 of a terrain including mountains 114 and a target 116 may approach the device 100.

The reflected energy detecting device 100 may also comprise a ground transmitter/receiver 118, a main or ground controller 120 and, as shown, multiple platforms 122. The ground transmitter/receiver 118 is also preferably operated at a radar frequency and comprises an antenna 124 from which a transmitted electromagnetic signal or beam 130 may radiate as illustrated by arrows 26. As shown, the beam 130 may be reflected from the target 116. The ground controller 120 functions similar to the ground controller 20, except in a multiple format, to control and align reflectors and/or phase shifter arrays of each platform 122.

The present invention enables, e.g., the location of high power reflected energy detecting capability at elevations that may look over the earth's curvature and interfering terrain features. Location of reflector fed phased array antennas as high as 20 Kilometers with ranges of 400 kilometers to the earth's horizon appears possible. There are applications where this concept could provide airborne reflected energy surveillance at a fraction of today's cost. Advantages of the present invention over present methods of elevating a reflected energy system include reductions in the weight and power requirements of the elevated hardware, simplified operation and maintenance of the hardware and simplified platform configuration as structures to support the reflector hardware need only a fraction of the strength of that necessary to support an entire reflected energy system. For example, aerostats and aircraft can support and operate reflector/refractors at a fraction of the cost and effort of elevating a complete reflected energy system.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included Within the spirit and scope of the appended claims.

What is claimed is:

1. A reflected energy detecting device, comprising:
   a transmitter transmitting an electromagnetic signal;
   a receiver receiving a reflected electromagnetic signal;
   an antenna, operatively connected with the transmitter and the receiver, radiating the electromagnetic signal and capturing the reflected electromagnetic signal, the antenna being movable;
   a main controller controlling operation of the transmitter and the receiver and movement of the antenna; and
   at least one elevated platform, the at least one elevated platform; supporting,
      a reflector remote from the transmitter and the receiver, being dimensioned and configured to redirect the transmitted electromagnetic signal in a desired direction, and
      a platform controller configured to communicate with the main controller and to maintain alignment between the remote reflector and the antenna.

2. The device of claim 1, further comprising a phase shifter array positioned within a beam of electromagnetic energy formed by the transmitted electromagnetic signal and the reflected electromagnetic signal.

3. The device of claim 2, wherein the platform controller is configured to control operation of the phase shifter array.

4. The device of claim 3, wherein the phase shifter array comprises a space fed phased array radar antenna.

5. The device of claim 2, wherein the phase shifter array is integrally connected with the reflector.

6. The device of claim 1, wherein:
   the remote reflector is movably supported by the elevated platform; and
   the main controller comprises a main computer and the platform controller comprises a platform computer and wherein commands are communicated between the main computer and the platform computer for effecting movement of the remote reflector to scan the transmitted electromagnetic signal over a desired area.

7. The device of claim 1, further comprising a stabilizer and a vibration isolator disposed between the at least one elevated platform and the remote reflector.

8. The device of claim 7, further comprising an actuator disposed between the at least one elevated platform and the remote reflector, the actuator being configured to provide rotational and translational relative movement between the at least one elevated platform and the remote reflector and wherein the platform controller is configured to control operation of the actuator.

9. The device of claim 1, wherein the main controller and the platform controller communicate via at least one of wireless and wired communications.

10. The device of claim 1, wherein the transmitted electromagnetic signal is transmitted in the radio frequency band.

11. The device of claim 1, wherein the transmitted electromagnetic signal is transmitted in the light frequency band.

12. The device of claim 1, wherein the at least one elevated platform is movable.

13. The device of claim 1, wherein the at least one elevated platform is mobile.

14. The device of claim 13, wherein the at least one elevated platform comprises at least one of a mobile tower, an airship, an aerostat, a piloted aircraft and an unpiloted aircraft.

15. The device of claim 1, wherein the at least one elevated platform comprises a plurality of movable platforms.

16. The device of claim 1, wherein the remote reflector comprises a reflective surface which is generally flat.

17. The device of claim 1, wherein the remote reflector comprises a metallic substance.

18. The device of claim 1, wherein the antenna is dimensioned and configured to focus the transmitted electromagnetic signal at the location of the at least one elevated platform.

19. The device of claim 1, wherein the elevated platform further comprises position sensors being operatively connected with the platform controller.

20. The device of claim 1, wherein the antenna comprises a directional antenna.

21. A radar system for detecting a target, comprising:
   a ground-based transmitter transmitting an electromagnetic signal;
   a ground-based receiver; and
   an elevated platform comprising a reflector that redirects the transmitted electromagnetic signal in a desired direction, and redirects a reflected electromagnetic signal from a target to the ground-based receiver.

* * * * *